(12) United States Patent
Shaked et al.

(10) Patent No.: US 11,485,849 B2
(45) Date of Patent: Nov. 1, 2022

(54) COMPOSITE BIODEGRADABLE POLYMERIC BASED MATERIAL, A PRODUCT AND A METHOD OF MAKING SAME

(71) Applicant: Balena Ltd., Tel Aviv (IL)

(72) Inventors: Yanir Shaked, Megiddo (IL); David Renzo Roubach, Tel Aviv (IL)

(73) Assignee: Balena Ltd., Tel Aviv (IL)

( * ) Notice: Subject to any disclaimer, the term of this patent is extended or adjusted under 35 U.S.C. 154(b) by 0 days.

(21) Appl. No.: 17/520,675

(22) Filed: Nov. 7, 2021

(65) Prior Publication Data

US 2022/0282084 A1 Sep. 8, 2022

Related U.S. Application Data (60) Provisional application No. 63/208,073, filed on Jun. 8, 2021, provisional application No. 63/156,454, filed on Mar. 4, 2021.

(51) Int. Cl.

| | | |
|---|---|---|
| *C08L 67/03* | (2006.01) | |
| *B33Y 70/00* | (2020.01) | |
| *B33Y 10/00* | (2015.01) | |
| *B29C 48/08* | (2019.01) | |
| *C08K 5/00* | (2006.01) | |
| *C08K 3/013* | (2018.01) | |
| *C08L 29/04* | (2006.01) | |
| *B29K 67/00* | (2006.01) | |
| *B29K 29/00* | (2006.01) | |

(52) U.S. Cl.
CPC .............. *C08L 67/03* (2013.01); *B29C 48/08* (2019.02); *B33Y 10/00* (2014.12); *B33Y 70/00* (2014.12); *C08K 3/013* (2018.01); *C08K 5/0016* (2013.01); *C08L 29/04* (2013.01); *B29K 2029/04* (2013.01); *B29K 2067/006* (2013.01); *C08L 2201/06* (2013.01)

(58) Field of Classification Search
CPC .......... C08L 75/00; C08L 75/02; C08L 75/04; C08L 75/06; C08L 75/08; C08L 75/10; C08L 75/12; C08L 75/14; C08L 75/16; C08L 67/00; C08L 67/02; C08L 67/025; C08L 67/03; C08L 67/04; C08L 67/006; C08L 67/07; C08L 67/08; C08L 2201/06; B33Y 30/00; B33Y 10/00; B29K 2205/00; B29K 2203/00; B29K 2201/00; B29K 2201/08; B29K 2201/12; B29K 2201/14; B29K 2201/18; B29K 2105/26; B29K 2101/00; B29K 2101/10; B29K 2101/12; B29K 2075/00; B29K 2067/00; B29K 2067/003; B29K 2067/006; B29K 2067/04; B29K 2067/043; B29K 2067/046; B29K 2031/04; B29K 2029/04; B29K 2029/14; B29K 2075/02; C08K 3/013; C08K 5/0016
See application file for complete search history.

(56) References Cited

U.S. PATENT DOCUMENTS

| | | |
|---|---|---|
| 5,998,552 A | 12/1999 | Brosch et al. |
| 6,231,960 B1 | 5/2001 | Dyer et al. |
| 7,902,271 B2 | 3/2011 | Grossman |
| 7,956,101 B2 | 6/2011 | Grossman |
| 8,026,188 B2 | 9/2011 | Mor |
| 8,487,018 B2 | 7/2013 | Grossman |
| 8,834,907 B2 | 9/2014 | Busolo et al. |
| 9,751,993 B2 | 9/2017 | Mor |
| 2010/0273224 A1 | 10/2010 | Boesmann et al. |
| 2011/0288224 A1 | 11/2011 | Gimenez et al. |
| 2012/0135169 A1* | 5/2012 | Tangelder ............... C08L 67/04 428/35.2 |
| 2017/0233899 A1* | 8/2017 | Kim ..................... C08G 18/831 264/308 |
| 2019/0345361 A1 | 11/2019 | Baum et al. |
| 2020/0032437 A1 | 1/2020 | Gomis et al. |
| 2020/0269535 A1 | 8/2020 | Falken |
| 2020/0369872 A1 | 11/2020 | Trump et al. |

FOREIGN PATENT DOCUMENTS

| | | |
|---|---|---|
| CN | 113861635 A | 12/2021 |
| FR | 3094268 A1 | 10/2020 |
| KR | 102212601 B1 | 2/2021 |
| WO | 9514741 A1 | 6/1995 |
| WO | 2013174870 A1 | 11/2013 |
| WO | 2019094806 A1 | 5/2019 |
| WO | 2019226719 A1 | 11/2019 |
| WO | 2020079083 A1 | 4/2020 |
| WO | 2020118080 A1 | 6/2020 |
| WO | 2020198656 A2 | 10/2020 |

(Continued)

OTHER PUBLICATIONS

"Can You Estimate Modulus from Durometer Hardness for Silicones?" Dow White Paper, 2019 (Year: 2019).*

Ruess, "Convert Durometer to Young's Modulus", downloaded from "www.cati.com/blog/convert-durometer-to-youngs-modulus/" on Jul. 11, 2022, published Jul. 14, 2011. (Year: 2011).*

Hapco, Inc. Hardness Comparison Chart, downloaded from "hapcoincorporated.com/resources/hardness-comparison-chart/" on Jul. 11, 2022. (Year: 2022).*

Smooth-On, Durometer Shore Hardness Scale, downloaded from "www.smooth-on.com/page/durometer-shore-hardness-scale/", on Jul. 11, 2022. (Year: 2022).*

(Continued)

*Primary Examiner* — Christopher M Rodd (74) *Attorney, Agent, or Firm* — The Roy Gross Law Firm, LLC; Roy Gross (57) ABSTRACT

Disclosed is a composite biodegradable polymeric based material comprising: a biodegradable polymeric matrix; at least 5 wt. % biodegradable plasticizer; and at least 2 wt. % biodegradable filler configured to stabilize the biodegradable plasticizer inside the polymeric matrix.

13 Claims, 3 Drawing Sheets

(56) References Cited

FOREIGN PATENT DOCUMENTS

WO      2021017030 A1    2/2021

OTHER PUBLICATIONS

Aeromarine, "Durometer Shore Hardness Scale Explained", downloaded from "www.aeromarineproducts.com/durometer-shore-hardness-scale/" on Jul. 11, 2022. (Year: 2022).*

Hapco, Inc. Hardness Comparison Chart (black and white version), downloaded from "hapcoincorporated.com/resources/hardness-comparison-chart/" on Jul. 11, 2022. (Year: 2022) (Year: 2022).*

J-Flex Rubber Products "How is Rubber Hardness Measured? What does Shore Hardness mean? downloaded from www.j-flex.com/how-is-rubber-hardness-measured-what-does-shore-hardness-mean/" on Jul. 11, 2022, published Nov. 26, 2019 (Year: 2019).*

\* cited by examiner

110 — MIXING TOGETHER: A BIODEGRADABLE POLYMERIC MATRIX; BIODEGRADABLE OIL-BASED PLASTICIZER; AND BIODEGRADABLE FILLER

120 — SHAPING THE MIXTURE TO FORM A COMPOSITE BIODEGRADABLE POLYMERIC BASED PRODUCT USING AT LEAST ONE OF: EXTRUSION, INJECTION MOLDING AND 3D PRINTING

COMPOSITE BIODEGRADABLE POLYMERIC BASED MATERIAL, A PRODUCT AND A METHOD OF MAKING SAME

CROSS-REFERENCE TO RELATED APPLICATIONS

This application claims the benefit of priority of U.S. Patent Application No. 63/156,454, filed Mar. 4, 2021, and of U.S. Patent Application No. 63/208,073, filed Jun. 8, 2021, which are hereby incorporated by reference as if fully set forth herein in their entirety.

FIELD OF THE INVENTION

The present invention relates generally to biodegradable polymeric based materials. More specifically, the present invention relates to a composite biodegradable polymeric based material, a product and a method of making same.

BACKGROUND OF THE INVENTION

The fashion industry accounts for about 8% of the world's total greenhouse gas emissions. Furthermore, due to the frequent changes in "fashion", most of the products of this industry are being replaced constantly with very low level of recycling. Making the fashion industry one of the largest pollutant in the world. While natural fabrics such as, cotton and silk may degrade into harmless material, in time, all the synthetic fibers/materials are expected to last several hundreds of years.

The development of biodegradable polymeric materials is one of the greatest promises in reducing pollution from synthetic polymers. Biodegradable polymers are polymers configured to disintegrate by bacterial decomposition process to result in natural byproducts such as gases ($CO_2$, $N_2$), water, biomass, and inorganic salts.

Known biodegradable polymers include both natural polymers, such as, polysaccharides (e.g., starch) and synthetic polymers, such as polyester and combination of both synthetic and natural polymers. A promising synthetic polymer is polybutylene adipate terephthalate (PBAT). However, both polyester based biodegradable polymers and PBAT based biodegradable polymers are unsuitable for the use in the fashion industry due to their mechanical properties. Polyester based biodegradable polymers are too week and/or are highly hygroscopic and PBAT is too stiff and rigid for fashion articles.

Accordingly, there is a need for a biodegradable based polymer that will have both sufficient strength and flexibility for the use in fashion articles while being waterproof at least until a deliberate biodegradation processes is initiated (for example, in a composter).

SUMMARY OF THE INVENTION

Some aspects of the invention may be directed to a composite biodegradable polymeric based material comprising: a biodegradable polymeric matrix; at least 5 wt. % biodegradable plasticizer; and at least 2 wt. % biodegradable filler. In some embodiments, the biodegradable plasticizer is in a liquid state at a temperature between 10 and 50° C.; and biodegradable filler is present within the composite in an amount sufficient for retaining the biodegradable plasticizer inside the polymeric matrix.

In some embodiments, the biodegradable polymeric matrix is selected from: polybutylene adipate terephthalate (PBAT), Polyhydroxyalkanoates (PHA) and its copolymers, Polybutylene succinate PBS and its copolymers, Polylactic acid PLA and its copolymers or alike, poly vinyl acetate and its copolymers, thermoplastic polyurethane TPU and its copolymers and any combination thereof. In some embodiments, the composite biodegradable polymeric based material may further include at least 30 wt. % biodegradable polymeric matrix.

In some embodiments, soft modified polymers, such as, poly vinyl acetate and its copolymers may be added to the biodegradable polymeric matrix for producing a softer biodegradable composite material. Such biodegradable polymer systems may further use to bond and hold the biodegradable plasticizer. In some embodiments, the soft biodegradable polymer composition may cause softening of the biodegradable material to the required degree, for example, the degree required by the fashion industry.

As known in the art poly vinyl acetate is not considered "biodegradable polymer". However, the inventors have surprisingly found that adding up to 35 wt. % poly vinyl acetate to the polymeric matrix, when the other polymers are biodegradable polymers, may result in a biodegradable polymeric composition. Such a composition may fully decompose due to biologic processes.

In some embodiments, the biodegradable polymeric matrix may include 20-35 wt. % poly vinyl acetate from the total weight of the biodegradable material, for example, 22 wt. %, 26 wt. %, 28 wt. %, 30 wt. % poly vinyl acetate. In some embodiments, the rest of the biodegradable polymeric matrix may include other biodegradable polymers, such as PBAT, PHA and the like.

In some embodiments, the addition of the 20-35 wt. % poly vinyl acetate may cause softening of the biodegradable material to the required degree, for example, the degree required by the fashion industry. For example, a biodegradable material according to some embodiments of the invention, that includes 28 wt. % poly vinyl acetate may have shore A hardness of 70-80. Omitting the poly vinyl acetate may result in increase of the hardness to at least shore 80A up to shore 50D. In some embodiments, the biodegradable plasticizer is selected from: Acetyl tributyl citrate (ATBC), Acetyl triethyl citrate (ATEC), Isopentyl epoxy soyate, Bis(2-(2-butoxyethoxy)ethyl) adipate, citrate oils, and glycerol. In some embodiments, the composite biodegradable polymeric based material may further include at least 8 wt. % biodegradable plasticizer. In some embodiments, the composite biodegradable polymeric based material may further include at least 15 wt. % biodegradable plasticizer.

In some embodiments, the biodegradable filler is selected from, food waste, spices, starch-based products, cellulose and seaweeds.

Some aspects of the invention may be directed to a product made by injection molding of the composite biodegradable polymeric based material according to any embodiments of the invention.

Some additional aspects of the invention may be directed to a product made by 3D printing of the composite biodegradable polymeric based material according to any embodiments of the invention.

Some additional aspects of the invention may be directed to a product made by extrusion of the composite biodegradable polymeric based material according to any embodiments of the invention.

Some aspects of the invention may be directed to a method of making a composite biodegradable polymeric based product, comprising: mixing together: a biodegradable polymeric matrix; at least 5 wt. % biodegradable plasticizer; and at least 2 wt. % biodegradable filler configured to stabilize the biodegradable plasticizer inside the polymeric matrix, and shaping the mixture to form a composite biodegradable polymeric based product using at least one of: extrusion, injection molding and 3D printing. In some embodiments, the biodegradable plasticizer is in a liquid state at a temperature between 10 and 50° C.; and biodegradable filler is present within the composite in an amount sufficient for retaining the biodegradable plasticizer inside the polymeric matrix.

In some embodiments, the mixing is conducted in an extruder. In some embodiments, the extruded mixture is injected into a mold to form the product. In some embodiments, the mixture is extruded to form a-filament. In some embodiments, the filament is provided to a 3D printer for printing 3D objects. In some embodiments, the extruded mixture is extruded into a die to form a film.

BRIEF DESCRIPTION OF THE DRAWINGS

The invention, however, both as to organization and method of operation, together with objects, features, and advantages thereof, may best be understood by reference to the following detailed description when read with the accompanying drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Some aspects of the invention may be directed to a composite biodegradable polymeric based material and to an article or a product made from such a material. Additional aspects may be directed to methods of making such an article or product. A composite biodegradable polymeric based material according to some embodiments of the invention may include a polymeric matrix such as, PBAT matrix and relatively large amount (e.g., more than 5 wt. %) of plasticizer (e.g., oil-based plasticizer). The plasticizer may use to soften the PBAT to the degree required in fashion products, such as, footwear, bags, belts and the like. The major challenge in adding relatively large amount of plasticizer to PBAT, is the tendency of the plasticizer to extract from the PBAT matrix, thus, reducing the softening effect and forming undesired oily layer on the fabricated article.

In some embodiments, in order to stabilize and maintain the plasticizer inside the PBAT matrix, an additive may be added to the mixture. The inventors surprisingly found that natural materials, added in specific amounts may use to stabilize plasticizer inside the PBAT matrix. These materials were further found to provide additional properties to the final products, such as, color, texture and smell (e.g., cinnamon smelled flipflops, coffee smelled wallets, etc.)

As used herein a "product" may include any article that can be manufactured from polymers, for example, final products (e.g., fashion articles, toys, packages, kitchen tools, disposable dishes, and the like), semifinal products (e.g., threads) and raw materials to be provided for further processing (e.g., filaments for 3D printing). The product can be made using any know production method, such as, extrusion, injection molding, three-dimensional (3D) printing and the like.

As used herein, a fashion article, may be, a footwear, wallets, belts, bags, smartphone covers, bracelets, and the like.

As used herein a "biodegradable material" may be any material configured to substantially (e.g. about 50%, about 70%, about 80%, about 90%, about 95%, 99% or more degradation by weight of the material, including any range between) disintegrate by enzymatic (e.g. microbial) decomposition process. In some embodiments, the biodegradable material undergoes degradation so as to result in natural byproducts. In some embodiments, the term "biodegradable" as used herein, also encompasses the term "bioerodible", which describes a composition/article which decomposes under environmental conditions into smaller fractions, thus substantially losing its structure and/or mechanical properties. In some embodiments, the term "bioerosion" refers to erosion of the composition/article initiated by microorganisms, and resulting in at least partial degradation of the composition/article.

The biodegradable material may be from synthetic and/or natural source. In some embodiments, the bacterial decomposition of the biodegradable material may be a source for naturally hydrocarbon gas.

A composite biodegradable polymeric based material according to some embodiments of the invention may include a biodegradable polymeric matrix and at least 5 wt. % biodegradable plasticizers. The composite biodegradable polymeric based material may further include at least 2 wt. % biodegradable filler configured to stabilize the biodegradable plasticizer inside the polymeric matrix. In some embodiments, the biodegradable plasticizer is in a liquid state at a temperature between 10 and 50° C.; and biodegradable filler is present within the composite in an amount sufficient for retaining the biodegradable plasticizer inside the polymeric matrix.

In another aspect, there is provided herein a material comprising a biodegradable polymer in a form of a polymeric matrix, at least 2 wt. % biodegradable filler, and at least 5 wt. % biodegradable plasticizer, wherein the biodegradable filler and/or biodegradable plasticizer are distributed within the polymeric matrix. In some embodiments, the biodegradable filler and/or biodegradable plasticizer are homogenously distributed within the polymeric matrix. In some embodiments, the material is a composite material. In some embodiments, the material of the invention is biodegradable. In some embodiments, the material of the invention consists essentially of the biodegradable polymer, the biodegradable filler and the biodegradable plasticizer. In some embodiments, the material of the invention is a solid at a temperature ranging between −50 and 60° C., between −50 and 40° C., between 40 and 60° C., including any rang between.

In some embodiments, the term "material" and the term "biodegradable polymeric based material" are used herein interchangeably.

In some embodiments, the biodegradable plasticizer is located within the inner portion of the polymeric matrix. In some embodiments, the outer portion of the polymeric matrix is substantially devoid of the biodegradable plasticizer and/or of the biodegradable filler. In some embodiments, the biodegradable plasticizer modifies the mechanical properties of the composite material of the invention. In some embodiments, the material of the invention comprises an amount of the biodegradable plasticizer sufficient to provide elasticity thereto. In some embodiments, the material of the invention is an elastic material. In some embodiments, the material of the invention is an elastic material is a viscoelastic material. In some embodiments, the weight per weight (w/w) concentration of the biodegradable plasticizer is sufficient to provide elastic or viscoelastic properties to the material of the invention.

In some embodiments, a w/w concentration of the biodegradable filler within the composite of the invention is sufficient to substantially retain the biodegradable plasticizer within the polymer matrix. In some embodiments, a w/w concentration of the biodegradable filler within the composite of the invention is sufficient so as to retain at least 85%, at least 90%, at least 95%, at least 97%, at least 99%, at least 99.5%, at least 99.9% of the initial weight content of the biodegradable plasticizer, including any range between. In some embodiments, a w/w concentration of the biodegradable filler within the composite of the invention is sufficient for retaining the biodegradable plasticizer inside the polymeric matrix.

In some embodiments, a w/w concentration of the biodegradable filler within the composite of the invention is sufficient to substantially prevent leakage of the biodegradable plasticizer from the inner portion of the polymeric matrix.

In some embodiments, the composite material substantially retains at least 90%, at least 95%, at least 97%, at least 99%, at least 99.5%, at least 99.9% by weight of the biodegradable plasticizer inside the polymeric matrix, when exposed to a pressure of up to 200 Kg/m2

In some embodiments, the polymeric matrix is a porous material. In some embodiments, the polymeric matrix is characterized by a porosity between 10 and 99%, between 10 and 20%, between 20 and 50%, between 50 and 70%, between 70 and 80%, between 80 and 90%, between 90 and 99%, including any range between.

In some embodiments, the composite material comprises a single biodegradable polymer specie, or a plurality of chemically distinct biodegradable polymers (e.g. a polymer blend). In some embodiments, the biodegradable polymer of the invention is a thermoplastic polymer. In some embodiments, the biodegradable polymer of the invention is or comprises a polyester, such as PCL, PLA, PGA, PLGA, PBAT, a polyhydroxyalkanoate (PHA) and its copolymers (e.g., PHB, PHBV, $PHH_x$, etc.), a polyol (e.g. polyvinylalcohol), a polyalkoxylate (e.g. PEG, PPG, etc.), Polybutylene succinate PBS and its copolymers, Polylactic acid PLA and its copolymers or alike, poly vinyl acetate and its copolymers, a starch-based polymer, a polydioxanone, a polyhydroxybutyrate, a polyhydroxyvalerate, a polyphosphoester, a polyamide (e.g. nylon, a polyamino acid) including any copolymer thereof, thermoplastic polyurethane TPU and its copolymers including any copolymer and any combination thereof. In some embodiments, the w/w concentration of the biodegradable polymer within the composite material is at least 15 wt. % at least, 15 wt. %, 20 wt. %, 25 wt. %, 30 wt %, 35 wt. %, 40 wt. %, 45 wt. %, 55 wt. %, 60 wt. %, 65 wt. %, 75 wt. % and more, including any range between. In some embodiments, the w/w concentration of the biodegradable polymer within the composite material is between 15 and 80%, between 15 and 90%, between 15 and 50%, between 50 and 75%, between 50 and 80%, between 50 and 60%, between 60 and 75%, between 60 and 80%, between 80 and 95%, between 80 and 90%, including any range between.

In some embodiments, the biodegradable polymer of the invention is a solid at a temperature ranging between −50 and 60° C., between −50 and 40° C., between 40 and 60° C., including any range between.

In some embodiments of the invention may be directed to a composite that may include one or more additional polymers (e.g. a bioerodible polymer and/or a non-degradable polymer). For example, the polymeric matrix may be, polyester and its copolymers, polyamides and its copolymers, styrinic polymer its copolymers and the like.

In some embodiments, the biodegradable plasticizer is non-compatible (e.g. immiscible) with the biodegradable polymer of the invention. In some embodiments, the biodegradable plasticizer of the invention is a liquid at a temperature ranging between −80° C. and 80° C., between −10° C. and 60° C., between 0° C. and 60° C., between 0° C. and 50° C., between 10° C. and 50° C., including any range between.

In some embodiments, the biodegradable plasticizer is a small molecule. In some embodiments, the biodegradable plasticizer is a small organic molecule having a MW of less than 1,000 Daltons (Da). In some embodiments, the biodegradable plasticizer has a MW of between 100 and 1,000 Da, between 100 and 300 Da, between 100 and 200 Da, between 200 and 500 Da, between 200 and 1000 Da, between 200 and 300 Da, between 100 and 500 Da, between 100 and 800 Da, between 300 and 500 Da, between 100 and 1,000 Da, between 500 and 800 Da, between 500 and 1,000 Da, between 800 and 1,000 Da, including any range between. Each possibility represents a separate embodiment.

In some embodiments, the biodegradable plasticizer is or comprises a single specie or a plurality of chemically distinct species. In some embodiments, the biodegradable plasticizer is or comprises alkyl citrate (e.g. Acetyl tributyl citrate (ATBC), triethyl citrate), epoxidized oil (e.g. Isopentyl epoxy soyate), alkoxylated carboxylic acid (e.g. Bis(2-

(2-butoxyethoxy)ethyl) adipate), citrate oils, oil, a fatty acid, or a fatty acid ester, a mono- or diglyceride, including any ester thereof, and polyol (e.g. glycerol, an oligosaccharide), or any combination thereof.

In some embodiments, the biodegradable plasticizer is or comprises any one of: acetyl tributyl citrate (ATBC), isopentyl epoxy soyate, bis(2-(2-butoxyethoxy)ethyl) adipate, citrate oils, glycerol, or any combination thereof. Additional biodegradable plasticizers are well known in the art. In some embodiments, more than 5 wt. % added to the composite material, in order to further soften the polymeric matrix, for example, 10 wt. %, 15 wt. %, 20 wt. % and more. In some embodiments, all the added plasticizer may remain in the polymeric matrix during the entire life of the product. In some embodiments, a w/w concentration of the biodegradable plasticizer within the composite material of the invention is between 5 and 20%, between 5 and 10%, between 10 and 15%, between 15 and 20%, between 5 and 10%, between 5 and 15%, between 5 and 7%, between 5 and 13%, between 13 and 20%, including any range between.

In some embodiments, in order to stabilized relatively large amounts of plasticizer inside the polymeric matrix, the composite material may further include at least 2 wt. % biodegradable filler, for example, 3 wt. %, 5 wt. % and more. In some embodiments, a w/w concentration of the biodegradable filler within the composite material of the invention is between 1 and 10%, between 2 and 10%, between 2 and 7%, between 2 and 5%, between 5 and 10%, including any range between.

Figure 2:
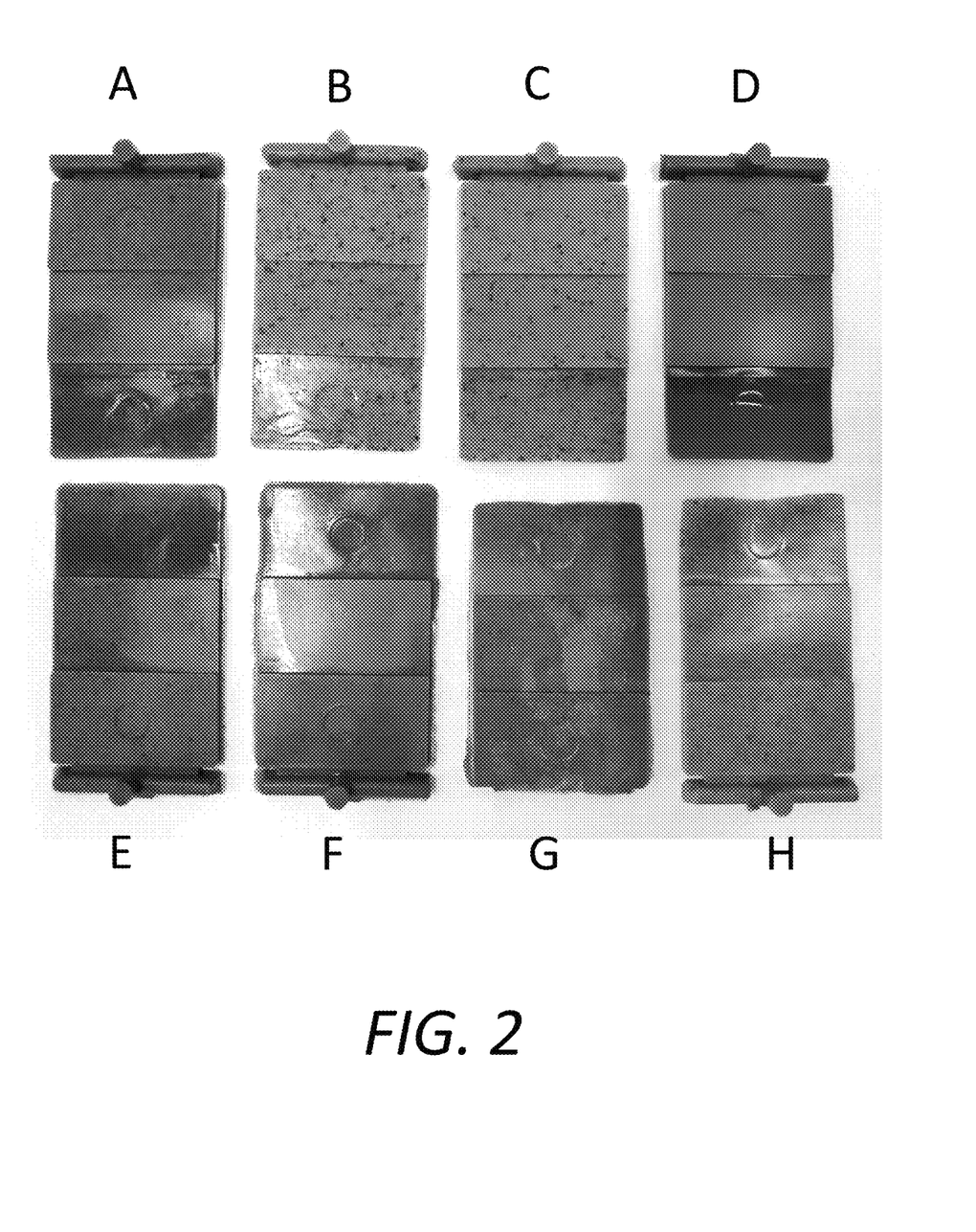
FIG. 2 shows images of samples made from composite biodegradable polymeric based materials according to some embodiments.

In some embodiments, the biodegradable filler may be from natural origin. For example, the biodegradable filler may be selected from, food waste, spices, starch-based products (e.g., cereals), cellulose (e.g., wood flicks), a waste particulate material (e.g. compost and/or wood waste material such as wood chips, saw dust, etc.), a plant material (e.g. flour, buckwheat flour, semolina flour, corn flour, corn starch, corn sledge, rice flour, tapioca flour, potato flour, soy flour, ground flax meal, flax flour, hemp flour), seaweeds and the like. The filler may provide, in addition to stabilizing the plasticizer, also colors (e.g., pigment), smell and texture to the composite material. Some examples for samples made using various filler are shown in FIG. 2. In some embodiments, additional biodegradable materials may be added, for example, natural pigments.

In some embodiments, the composite biodegradable polymeric based material may be used to fabricate an article, such as, a final product, semi-finished product or a raw material for the fabrication of other products, as discussed herein below with respect to the flowchart of FIG. 1. In some embodiments, a semi-finished product may be an extruded flat strand to be used for making belts and raw material may include extruded strips/strands filaments to be fed into a 3D printer for printing the product.

Figure 1:
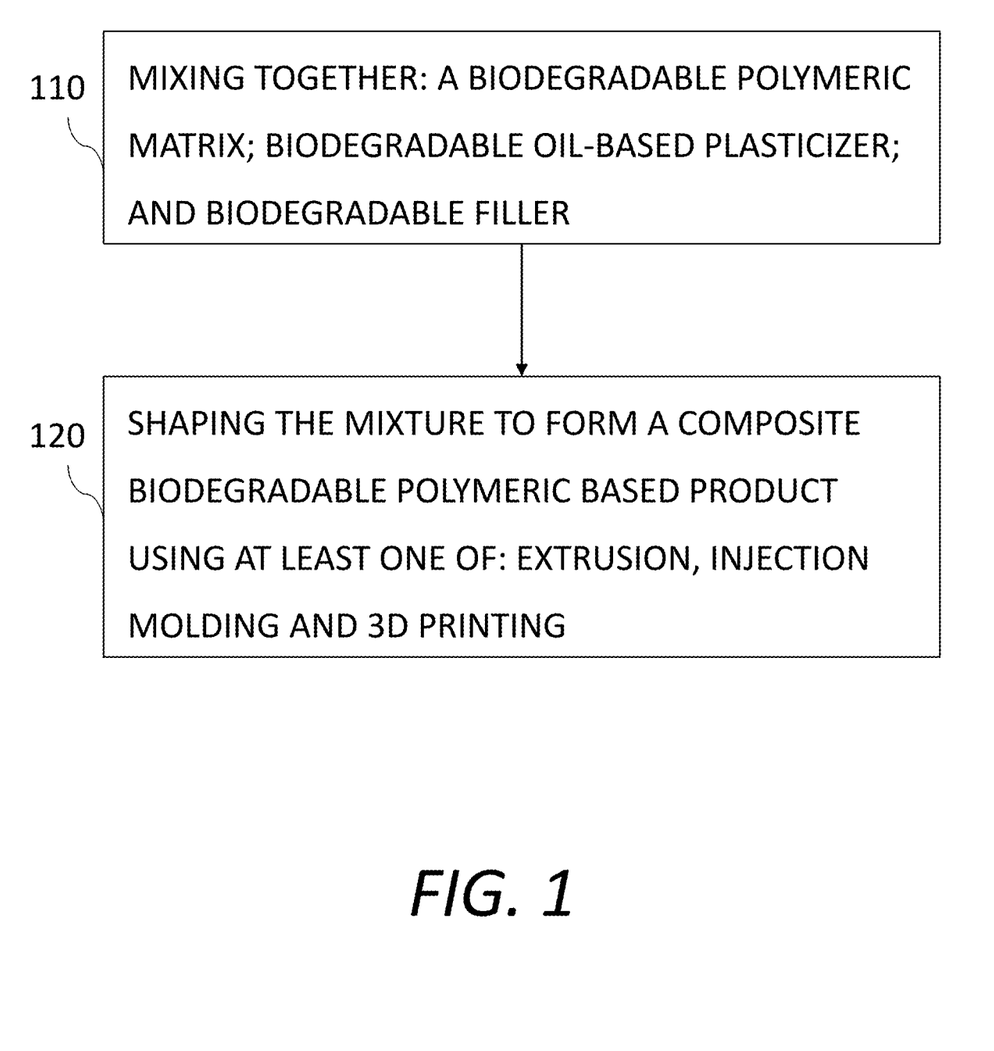
FIG. 1 is a flowchart of a method of making a product from composite biodegradable polymeric based material according to some embodiments.

Reference is made to FIG. 1 which is a flowchart of a method for making a composite biodegradable polymeric based product according to some embodiments of the invention. In step 110, all the components of the composite biodegradable polymeric based material may be mixed to form a mixture. The mixture may include a biodegradable polymeric matrix (e.g., PBAT), at least 5 wt. % biodegradable plasticizer and at least 2 wt. % biodegradable filler, as discloses herein above. In a nonlimiting example, all the components may be inserted into a twin-screw extruder, heated, above the melting or softening point of the relevant matrix to be mixed together to form the mixture. In some embodiments, other mixing equipment and techniques may be used for mixing the mixture.

In some embodiments, the mixture may be shaped to form the composite biodegradable polymeric based product, in step 120. For example, the mixture may be extruded directly for form elongated (e.g., spools) of trips or strands to be used as final products or raw material for additional products. Alternatively, the mixture can be injection molded into a final shape (e.g., a footwear). In a nonlimiting example, an injection molding machine can be used for forming final products, such as, flipflops, smartphone covers and the like. Additionally or alternatively, extruded filaments (e.g., strands) made from the composite biodegradable polymeric can be loaded into a 3D printing machine to be remelted and printed using any know method. In some embodiments, the composite biodegradable polymeric based may be extruded into a die to form a film (e.g., a sheet).

Experimental Results

Reference is now made to FIG. 2 which shows images of 8 samples made from composite biodegradable polymeric based material according to some embodiments of the invention. The samples were casted into aluminum molds and pressed using a 12-ton laboratory press. All samples were made with a PBAT matrix, using various biodegradable plasticizers and different fillers (e.g., grinded powders). Some of the fillers included natural pigments such as, 484C and 7771C. Table 1 summarizes the various compositions:

TABLE 1

| Sample | Plasticizer | Filler |
| --- | --- | --- |
| A | 13 wt. % ATBC | 3 wt. % Hibiscus |
| B | 12 wt. % ATBC | 3 wt. % Coffee |
| C | 12 wt. % ATBC | 3 wt. % coffee + 0.5 wt. 7771C |
| D | 12 wt. % ATBC | 0.5 wt. 7771C |
| E | 13 wt. % ATBC | 3 wt. % Hibiscus |
| F | 18 wt. % ATBC | 3 wt. % Rooibos + 0.5 wt. 484C |
| G | 13 wt. glycerol | 3 wt. % cinnamon |
| H | 18 wt. % ATBC | 3 wt. % Rooibos |

Each sample has a different color (not evident in the B&W image) and different smell. For example, samples B and C have a light brownish color with coffee flacks and a smell of coffee. In yet another example, sample E has an eggplant purple color while sample F has a dark red color. Sample G has a honey-like color and a cinnamon smell.

Additional experimental compositions are given in table 2, which shows various biodegradable polymeric matrixes, with various plasticizers and various fillers.

TABLE 2

| Sample | Matrix | Plasticizer | Filler |
| --- | --- | --- | --- |
| I | 45 wt. % PBAT 35 wt. % PBSA | 10 wt. % ESBO | 10 wt. % seaweed powder |
| II | 57.5 wt. % PBAT 25.5 wt. % TPU | 15 wt. % ATBC | 2 wt. % seaweed powder |
| III | 50 wt. % PBAT 25 wt. % PVA copolymer | 15 wt % bis(2-(2-butoxyethoxy)ethyl) adipate | 5 wt. % apple tea powder 5 wt. % starch |
| IV | 85 wt. % PBSA | 10 wt. % ESBO | 5 wt. % seaweed powder |

Additional experimental compositions are given in table 3, which shows various biodegradable polymeric matrixes, with various plasticizers and various fillers.

TABLE 3

| Sample | Matrix | Plasticizer | Filler |
|---|---|---|---|
| I | 40-60 wt. % PBAT, 10-20 wt. % PVA copolymer | 20% ATBC | 5-15 wt. % Starch, Safflower |
| II | 40-60 wt. % PBAT, 10-20 wt. % PVA copolymer | 20% ATBC | 5-15 wt. % Starch, Alcea |
| III | 40-60 wt. % PBAT, 10-20 wt. % PVA copolymer | 26% ATBC | 10-20 wt. % Starch |
| IV | 40-60 wt. % PHB, 10-20 wt. % PVA copolymer | 20% ATBC | 5-10 wt. % Starch |
| V | 40-60 wt. % PBAT (bio-based), 10-20 wt. % PVA copolymer | 20% ATBC | 5-10 wt. % Starch, Graphite |

Figure 3:
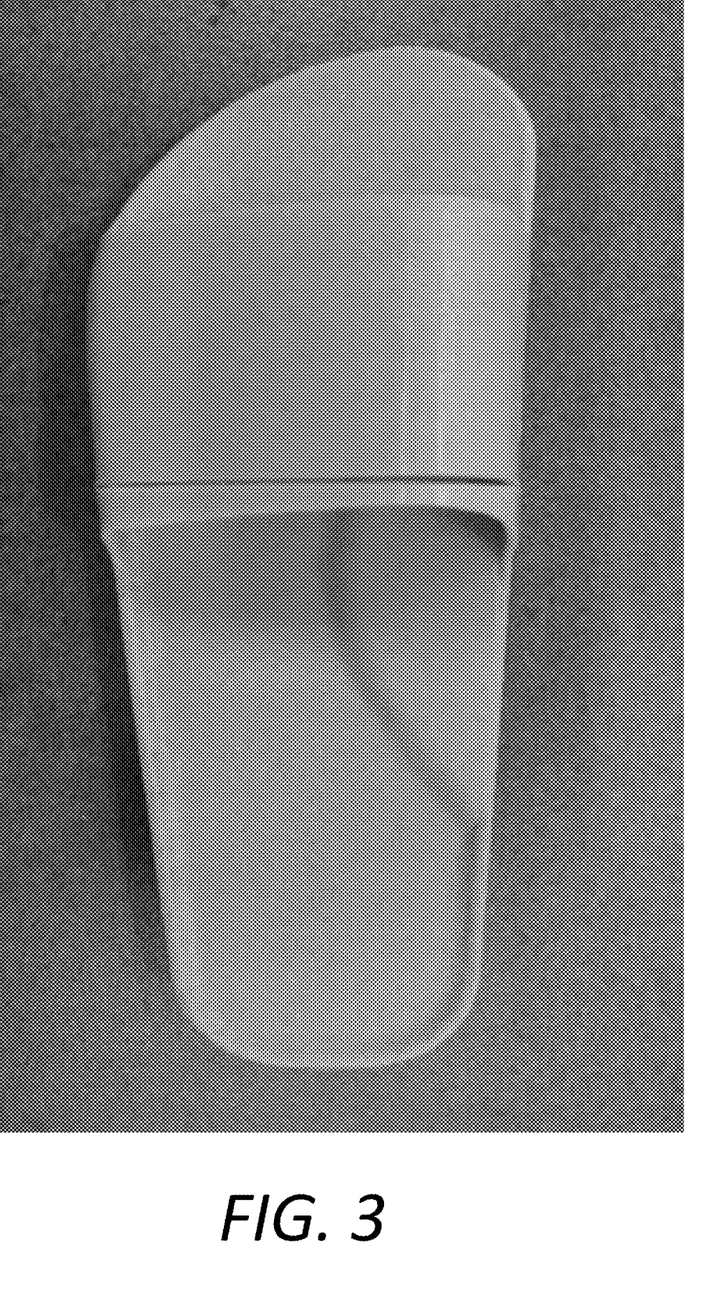
FIG. 3 shows an image of a flipflop made from composite biodegradable polymeric based material according to some embodiments of the invention.

Reference is now made to FIG. 3 which is an image of a flipflop made from the composite biodegradable polymeric based material according to some embodiments of the invention. The composite material of the flipflop of FIG. 3 included PBAT matrix, 15 wt. % ATBC plasticizer and 3 wt. % seaweed powder. The result was a greenish soft flipflop with no oily surfaces. The flipflop was injection molded into its final shape directly after mixing the mixture in the extruder.

In some embodiments, all tested samples fully decomposed in a compost according to acceptable practices. For example, two flipflops discussed with respect to FIG. 3, were inserted into a plastic net and buried in a compost pile at 50-100 cm depth. After 98 days (e.g., approx. 3 months) the flipflops completely biologically disintegrated.

The mechanical properties of various samples were measured according to known standards. Shore hardness was measure according to ASTM D2240 for measuring the hardness of polymers, elastomers, and rubbers. The tested shore hardness of samples according to embodiments of the invention was shore A hardness of 65-95 and shore D hardness 15-50. This result shows sufficient hardness for any fashion article, such as, flipflops, wallets, belts, etc.

As can be seen, composite biodegradable polymeric based materials may be promising environmentally friendly materials for the fashion industry as well as other industries, such as, toys manufacturers, toys, packages, manufacturers kitchen tools manufacturers, disposable dishes manufacturers, and the like and the like.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A composite biodegradable polymeric-based material comprising:
   at most 80 wt. % biodegradable polymeric matrix comprising polyvinyl acetate at 20-35 wt. % from the total weight of the matrix, or any copolymer thereof;
   15 to 26 wt. % biodegradable plasticizer; and
   5 to 20 wt. % biodegradable filler,
   wherein the biodegradable softening plasticizer is in a liquid state at a temperature between 10 and 50° C.; and biodegradable filler is present within the composite in an amount sufficient for retaining the biodegradable plasticizer inside the polymeric matrix, and
   wherein the composite biodegradable polymeric-based material has a shore hardness of 56A to 90A.

2. The composite biodegradable polymeric based material of claim 1, wherein the biodegradable polymeric matrix comprises at least one of: polybutylene adipate terephthalate (PBAT), Polyhydroxyalkanoates (PHA) and its copolymers, Polybutylene succinate PBS and its copolymers, Polylactic acid PLA and its copolymers, polyglycolic acid (PGA), poly(lactic-co-glycolic acid) (PLGA) poly vinyl alcohol, and thermoplastic polyurethane TPU and its copolymers.

3. The composite biodegradable polymeric based material of claim 1, wherein the biodegradable plasticizer is selected from a group consisting of:
   alkyl citrate, epoxidized oil, alkoxylated carboxylic acid, Bis(2-(2-butoxyethoxy)ethyl) adipate, citrate oils, and polyol and any combination thereof.

4. The composite biodegradable polymeric based material of claim 1, wherein the biodegradable filler is selected from a group consisting of, plant material, waste material, spices, starch based products, cellulose and seaweeds and any combination thereof.

5. The composite biodegradable polymeric based material of claim 1, comprising at least 30 wt. % biodegradable polymeric matrix.

6. A product made from, a composite biodegradable polymeric based material comprising:
   at most 80 wt. % biodegradable polymeric matrix comprising polyvinyl acetate at 20-35 wt. % from the total weight of the matrix, or any copolymer thereof;
   15 to 26 wt. % biodegradable plasticizer; and
   5 to 20 wt. % biodegradable filler, wherein the biodegradable plasticizer is in a liquid state at a temperature between 10 and 50° C.; and biodegradable filler is present within the composite in an amount sufficient for retaining the biodegradable plasticizer inside the polymeric matrix,
   wherein the composite biodegradable polymeric-based material has a shore hardness of 56A to 90A.

7. The product of claim 6, made by one of: injection molding, 3D printing and extrusion.

8. A method of making a composite biodegradable polymeric based product, comprising: mixing together, without adding any water:
   at most 80 wt. % biodegradable polymeric matrix comprising 20-35 wt. % from the total weight of the matrix, polyvinyl acetate, or any copolymer thereof;
   15 to 26 wt. % biodegradable plasticizer; and
   5 to 20 wt. % biodegradable filler, wherein the biodegradable plasticizer is in a liquid state at a temperature between 10 and 50° C.; and biodegradable filler is present within the composite in an amount sufficient for retaining the biodegradable plasticizer inside the polymeric matrix, and shaping the mixture to form a composite biodegradable polymeric based product using at least one of: extrusion, injection molding and 3D printing, wherein the composite biodegradable polymeric-based material has a shore hardness of 56A to 90A.

9. The method of claim 8, wherein the mixing is conducted in an extruder.

10. The method of claim 9, wherein the mixture is injected into a mold to form the product.

11. The method of claim 8, wherein the mixture is extruded to form a-filament.

12. The method of claim 11, wherein the filament is provided to a 3D printer for printing 3D objects.

13. The method of claim 8, wherein the mixture is extruded into a die to form a film.

* * * * *